(12) United States Patent
Berndt

(10) Patent No.: US 11,607,082 B2
(45) Date of Patent: Mar. 21, 2023

(54) FOOD CUTTING AND PREPARATION SURFACE WITH ANTIMICROBIAL AND ANTI-SLIP PEGS

(71) Applicant: Lawrence Berndt, Cornish, NH (US)

(72) Inventor: Lawrence Berndt, Cornish, NH (US)

(*) Notice: Subject to any disclaimer, the term of this patent is extended or adjusted under 35 U.S.C. 154(b) by 131 days.

(21) Appl. No.: 17/193,265

(22) Filed: Mar. 5, 2021

(65) Prior Publication Data

US 2021/0186269 A1   Jun. 24, 2021

Related U.S. Application Data

(63) Continuation of application No. 16/354,425, filed on Mar. 15, 2019, now Pat. No. 10,966,572.

(51) Int. Cl.
| | | |
|---|---|---|
| *B25B 11/00* | (2006.01) | |
| *A47J 47/00* | (2006.01) | |
| *A47J 36/04* | (2006.01) | |

(52) U.S. Cl.
CPC ............ *A47J 47/005* (2013.01); *A47J 36/04* (2013.01)

(58) Field of Classification Search
CPC ............................... A47J 47/00; A47J 47/005
See application file for complete search history.

(56) References Cited

U.S. PATENT DOCUMENTS

| | | | | |
|---|---|---|---|---|
| 3,947,012 A | * | 3/1976 | Cobb | A47J 47/005 269/302.1 |
| 6,702,273 B1 | | 3/2004 | Sellers | |
| 10,588,464 B2 | | 3/2020 | Assassa | |
| 10,655,903 B2 | * | 5/2020 | Walls, Jr. | E06B 5/00 |
| 10,966,572 B2 | * | 4/2021 | Berndt | A47J 47/005 |
| 2014/0215944 A1 | * | 8/2014 | Husler | E04F 15/02044 52/302.1 |
| 2017/0027314 A1 | * | 2/2017 | Guzman | A47B 13/14 |
| 2018/0140141 A1 | * | 5/2018 | Russell | A47J 47/005 |
| 2020/0187720 A1 | * | 6/2020 | Kilcher | A47J 47/16 |
| 2020/0215799 A1 | * | 7/2020 | Hedlund | B32B 7/12 |
| 2020/0288916 A1 | * | 9/2020 | Berndt | A47J 36/04 |
| 2021/0186269 A1 | * | 6/2021 | Berndt | A47J 47/005 |

OTHER PUBLICATIONS

"Inorganic Silver Antimicrobial", Ishizuka Glass Co Ltd, [online] retrieved from: "https://www.ishizuka.co.jp/english/material/antimicrobial/", Dec. 2013; retrieved on Jul. 25, 2019.
"Wusthof Thermo Beechwood Cutting Board with Metal Frame", Williams Sonoma, [online] retrieved from: "https://www.williams-sonoma.com/products/wusthof-beech-cutting-board-with-metal-frame/?pkey=s%7Cw%C3%BCsthof%20thermo%20beechwood%20cutting%20board%7C2"., Dec. 2018; retrieved on Jul. 25, 2019.

* cited by examiner

*Primary Examiner* — Lee D Wilson

(74) *Attorney, Agent, or Firm* — Nields, Lemack & Frame, LLC

(57) ABSTRACT

Surfaces suitable for cutting boards, cheese boards or other food preparation activities. In certain embodiments, the surfaces are wood that has been subjected to torrefaction. In certain embodiments, the surfaces are substantially planar, and include one or more pegs that have antimicrobial activity.

11 Claims, 5 Drawing Sheets

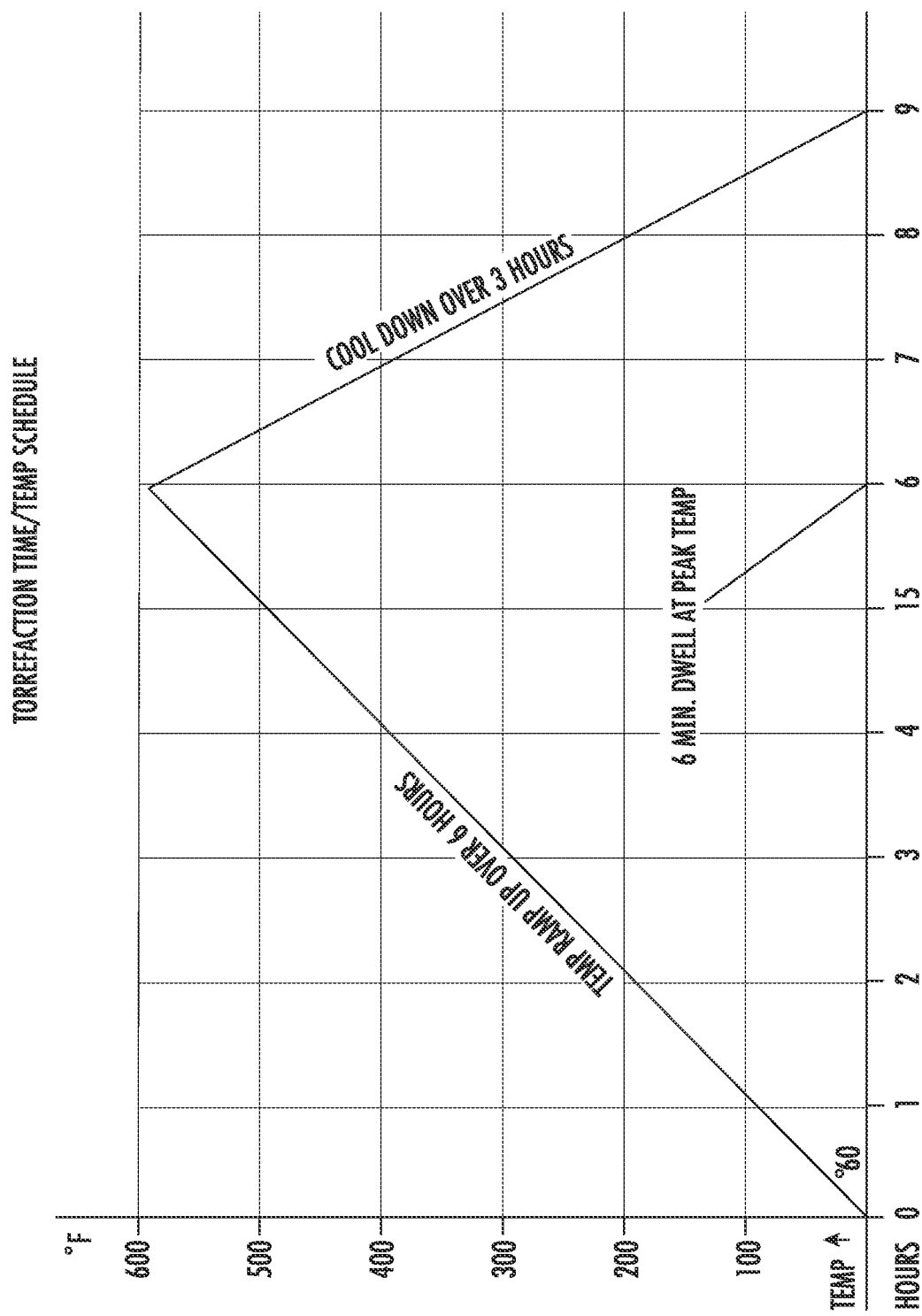

FOOD CUTTING AND PREPARATION SURFACE WITH ANTIMICROBIAL AND ANTI-SLIP PEGS

This application is a Continuation of U.S. patent application Ser. No. 16/354,425 filed Mar. 15, 2019, the disclosure of which is incorporated herein by reference in its entirety.

BACKGROUND

Embodiments disclosed herein relate to a food surface such as a cutting board or cheese board. Such surfaces are typically used to cut or hold food products.

The management of bacteria during the preparation and handling of foods is a common objective when designing food processing articles in order to minimize or avoid food-borne illnesses. Current cutting boards in particular are a common source of food contamination, as bacteria can be present and proliferate on the surface and in the pores of such surfaces, contaminating other foods that are placed in contact with the board surface.

Accordingly, the material for manufacturing cutting boards must be chosen carefully. A suitable cutting board material should be durable, non-abrasive, and not so hard that it will damage or dull a knife used to cut the food on the surface. In addition, the cutting board should be aesthetically pleasing, since it is often visible to guests of a homeowner.

Plastics such as polyethylene, high-density polyethylene, etc. have been used as cutting boards, particularly since they may be cleaned by relatively harsh antiseptic chemicals to destroy any bacteria on their surface. However, they often lack the aesthetics sought after by consumers.

Wood also has been used as a cutting board surface. Hardwoods with relatively small pores are particularly suitable. Teak has been a common choice in view of its aesthetic qualities.

Preferred board surfaces should provide stability when placed on a counter top, table or other surface in a kitchen or dining area. In addition, such surfaces should exhibit good water or moisture resistance, and also exhibit resistance to microbes.

It therefore would be desirable to provide a board such as a cutting or cheese board that is aesthetically pleasing, has antibacterial properties, and is durable.

SUMMARY

Problems of the prior art have been addressed by embodiments disclosed herein, which generally relate to surfaces suitable for cutting boards, cheese boards or other food preparation activities. In certain embodiments, the surfaces are maple or birch wood that has been subjected to torrefaction. In certain embodiments, the surfaces are substantially planar or flat, and include one or more pegs that have antimicrobial activity. The peg or pegs may function to support the surface on a substrate such as a countertop.

In some embodiments, a food surface comprises a substantially planar or flat sheet of torrefied wood material having at least one through-hole having a diameter, and an antimicrobial peg positioned in the through-hole, the antimicrobial peg having a main body region and two opposite head regions, wherein the head regions have a diameter greater than the diameter of the through-hole. In some embodiments, the two opposite head regions are positioned outside of the through-hole, and the main body region is position inside the through-hole. In some embodiments, there are a plurality of through-holes and a plurality of antimicrobial pegs. In some embodiments, the number of pegs equals the number of through-holes.

In certain embodiments, the antimicrobial pegs comprise neoprene. In certain embodiments, the pegs comprise neoprene and a powdered glass additive that includes antimicrobial metal ions such as copper, zinc and/or silver, or mixtures of one or more of these metal ions.

Some embodiments include a surface comprising a substantially planar sheet of torrefied wood material having at least one through-hole having a diameter, and an antimicrobial peg in the through-hole, the antimicrobial peg having a main body region and two opposite head regions, wherein the head regions have a diameter greater than the diameter of the through-hole and are positioned outside of the through-hole, and wherein the main body region is positioned inside the through-hole. The antimicrobial peg may be made of neoprene. Each of the two opposite head regions may be domed-shaped. The antimicrobial peg may include a powdered glass additive that includes one or more antimicrobial metal ions. The one or more antimicrobial metal ions may be silver, zinc, copper and mixtures of one or more of silver, zinc and copper.

BRIEF DESCRIPTION OF THE DRAWINGS

FIG. 4 is a graph showing the ramp up and ramp down temperatures of a torrefaction process in accordance with certain embodiments.

DETAILED DESCRIPTION

In certain embodiments, as can be seen in FIG. 1, the board 10 is substantially planar and flat, and made of wood. Suitable woods include maple, birch, cherry, or other closed grain woods. Preferably the wood is maple. In certain embodiments, the board 10 is a single integral piece with no joints or seams.

Preferably the wood is subjected to a torrefaction process, which is a thermal process that heats the board to a high temperature in the absence of oxygen, or at least in the absence of an amount of oxygen that would cause the board to combust. In some embodiments, the board is heated to a temperature between about 545° F. and 600° F. for several minutes. In some embodiments, the heating process slowly ramps the temperature to between 545° F. and 600° F., and the board is maintained at the high temperature for several minutes, and then the temperature is ramped down to below 140° F. The resulting torrefaction process converts resulting outgases to carbon with in the cell structure of the wood, and hinders the ability of the board to absorb moisture. The wood thus has an increased resistance to moisture and to bacteria. The board 10 can tolerate dishwasher conditions without degrading.

In certain embodiments, the board 10 is rectangular. In other embodiments, the board 10 is square or circular shaped. In still other embodiments, the board 10 may be any geometrical shape. In some embodiments, the board has a uniform thickness. One preferred thickness is ⅜ of an inch.

Figure 1A:
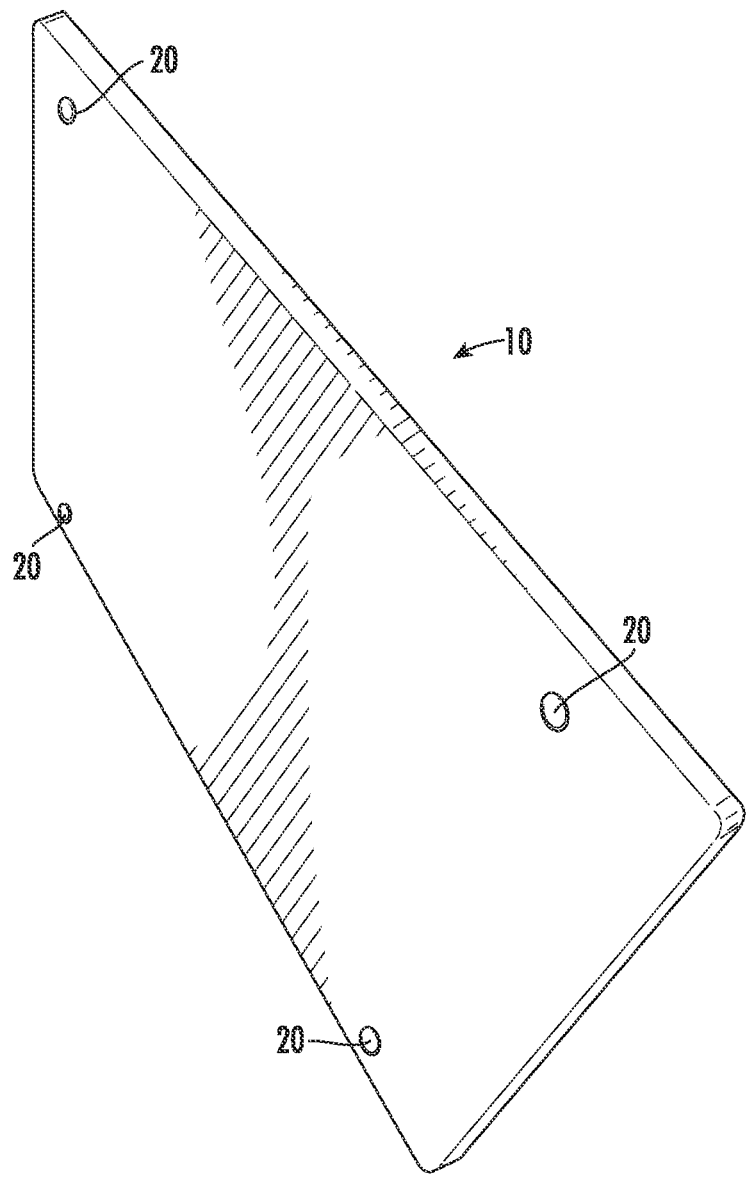
FIG. 1A is a perspective view illustrating a cutting board surface in accordance with certain embodiments.
Figure 1B:
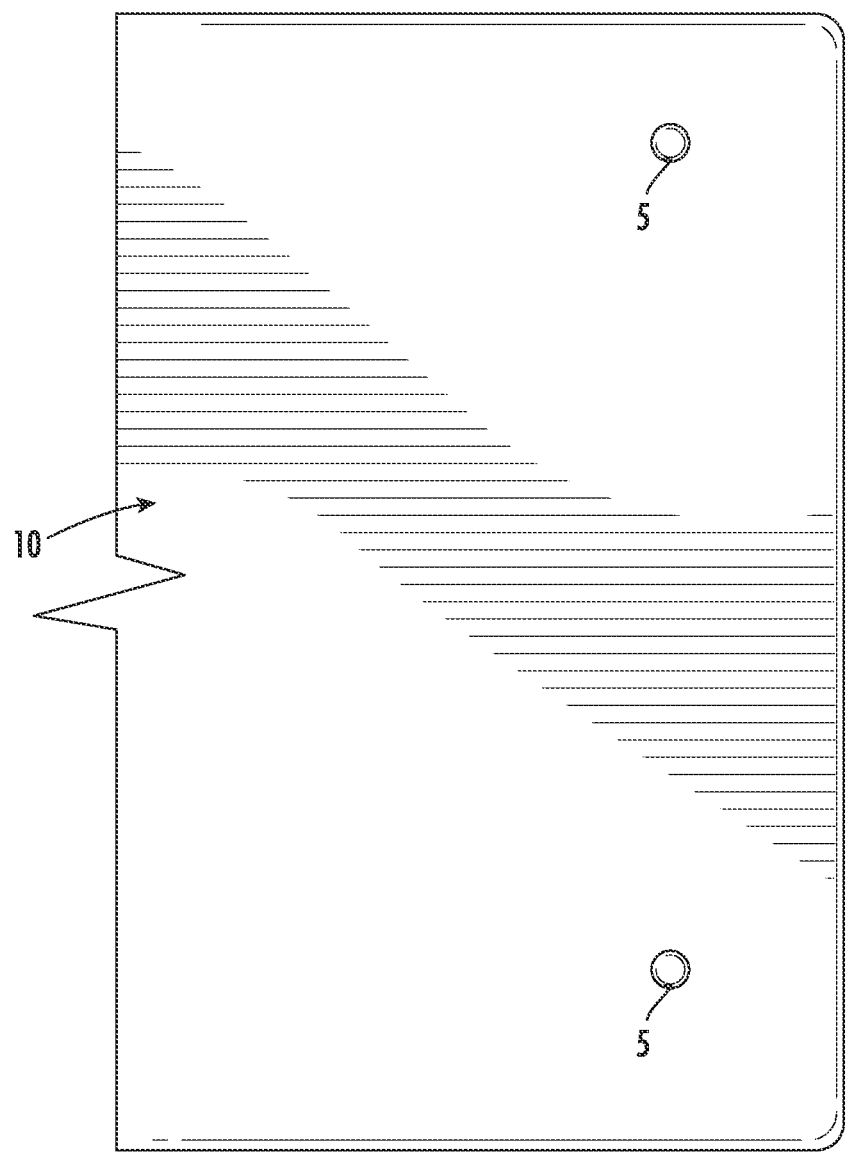
FIG. 1B is a view of a cutting board with through-holes exposed in accordance with certain embodiments

In certain embodiments, one or more apertures or through-holes 5 (FIG. 1B) are formed in the board 10, such as by drilling. Preferably four such through-holes 5 are formed, particularly where the board 10 is square or rectangular, or substantially square or rectangular in shape. In certain embodiments, when the board is square-shaped or rectangular-shaped, each of the four through-holes are formed near a respective corner of the square or rectangle as shown in FIG. 1A. In some embodiments, the through-holes are spaced about one inch from each edge that defines a corner. In some embodiments, each through-hole is circular and is 0.297 inches in diameter. Preferably the size of the through-holes should be large enough to receive the main body region 22 of a peg 20, as discussed in greater detail below, but smaller than the diameter of the head regions 24A, 24B of the peg 20.

Figure 2:
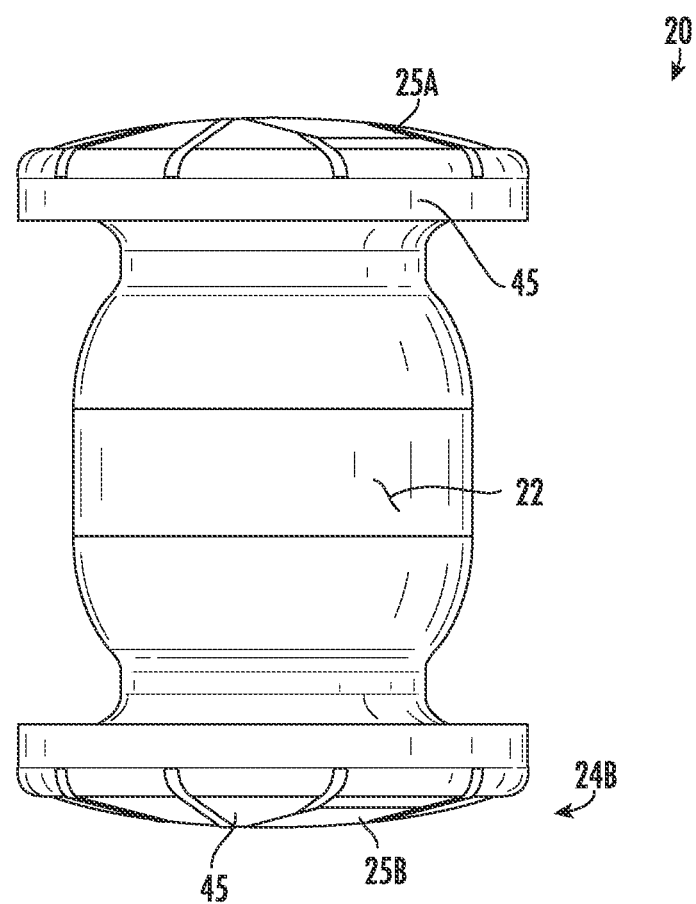
FIG. 2 is a cross sectional view of an antimicrobial peg in accordance with certain embodiments.

Turning now to FIG. 2, there is shown a peg 20 that may be used as a leg or support for the cutting board surface in accordance with certain embodiments. The peg 20 has a main body region 22, and two opposite head regions 24A and 24B. In some embodiments, the peg 20 is symmetrical about both a horizontal axis and a longitudinal axis. Each head region 24A, 24B may have a respective domed-shaped top surface 25A, 25B, and extends radially outwardly a distance greater than the main body region 22. The domed-shaped top surfaces 25A, 25B function as the surface that supports the board 10 when placed on a counter or other substrate. In some embodiments, the domed-shaped top surfaces 25A, 25B are anti-slip surfaces, which help minimize movement of the cutting board when placed on a substrate. The pegs 20 may also aid in stabilizing the board when placed on uneven surfaces.

In certain embodiments, the pegs 20 are made of neoprene having a powdered glass additive that includes antimicrobial metal ions, such as copper and/or silver and/or zinc, or mixtures of any of these metal ions. In some embodiments, the powdered glass additive is IONPURE, commercially available from Ishizuka Glass Co. Ltd. The powdered glass additive releases the antimicrobial metal ions in the presence of water to provide antimicrobial activity.

In some embodiments, surface area may be added to the top of the domed surface of one or more of the heads 24A, 24B, such as by forming surface characteristics, discontinuities, indentations or protrusions 45 in or on the surface. The surface characteristics may be built into the injection mold used to manufacture the peg so that they are transferred to the peg during the molding operation, such as in the form of a swirl or a plurality of raised circular dots. Alternatively, they may be added to the peg after molding. Suction cups also could be used.

Figure 3:
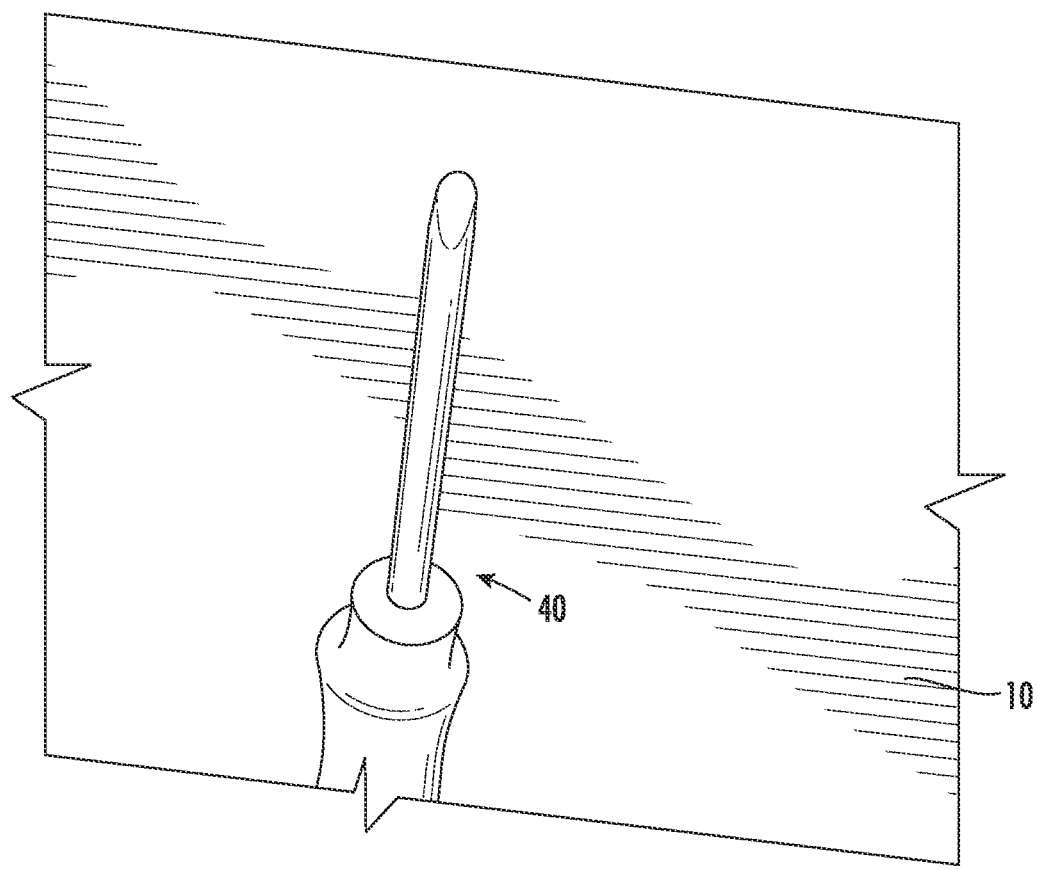
FIG. 3 is a view of a suitable tool for inserting pegs into a cutting board in accordance with certain embodiments.

The peg or pegs may be inserted into respective through-holes by any suitable means, such as with a conventional grommet insertion tool, an awl, a small screw driver, etc. In certain embodiments, since the peg is flexible, the insertion tool may be used to force a head region 24A into the through-hole and then through the through-hole so that it exits the opposite end from that entry end. For example, a tool 40 such as that shown in FIG. 3 may be used to apply pressure to the underside of a head region 24A, forcing it into a through-hole. The pressure may be applied around the perimeter of the underside of the head region 24A with the tip of the tool 40 until the entire head region 24A is in the through-hole and ultimately exits the opposite end.

EXAMPLE

A plurality of boards of wood are stacked in rows to a height suitable for the oven used to torrify the wood. Metal spacers, such as spacers that are ½'×½' square hollow aluminum tubing are used to separate the individual rows of boards. Temperature probes may be inserted into the center of some of the pieces of wood to allow tracking the internal wood temperature relative to the ambient temperature in the oven. The stacked wood is placed in the oven. Rollers may be used to facilitate transport of the wood.

The heat in the oven is ramped up in a manner to keep the internal wood temperature within a few degrees of the increasing ambient temperature, insuring minimum degradation of the wood from the heating process. As shown in FIG. 4, the temperature is ramped up over approximately 6 hours until the target peak temperature is reached, e.g., 600° F. This peak is maintained for at least several minutes, or the time necessary to achieve the target internal carbonization of the outgasses. This dwell time controls the degree of carbonization and also the final color of the wood. A light toast color results from a short dwell time. A dark chocolate color results from a long dwell time. These colors relate to the degree of modification to the original wood and also the performance characteristics of the altered wood. The wood may be torrefied to reach performance goals or to meet a color goal for aesthetic purposes. The temperature is then ramped down once the dwell time is complete, and usually lasts 3 hours or until the wood can be handled comfortably.

What is claimed is:

1. A cutting board surface configured to support food for cutting, comprising a torrefied wood material, the torrefied wood material having been subjected to a torrefaction process at a temperature between about 545° F. and about 600° F. while progressively cooling to a range below 140° F. which is sufficient to render the wood material resistant to moisture absorption such that the wood material does not degrade when exposed to dishwasher conditions.

2. The cutting board surface of claim 1, wherein said torrefied wood material comprises maple.

3. The cutting board surface of claim 1, wherein said torrefied wood material comprises birch.

4. The cutting board surface of claim 1, wherein said torrefied wood material comprises cherry.

5. The cutting board surface of claim 1, wherein said torrefaction process is carried out for a dwell time sufficient to cause said wood material to have a chocolate color.

6. The cutting board surface of claim 1, wherein said wood material is substantially planar and has a uniform thickness.

7. A process for cutting food on a cutting board surface, comprising placing food on a sheet of torrefied wood material, and cutting said food on said surface with a knife, said torrefied wood material having been torrefied in an oxygen starved environment and at a temperature sufficient to convert outgases from said wood material to carbon to render the wood material resistant to moisture absorption.

8. The process of claim 7, wherein said torrefied wood material comprises maple.

9. The process of claim 7, wherein said torrefied wood material comprises birch.

10. The process of claim 7, wherein said torrefied wood material comprises cherry.

11. The process of claim 7, wherein said wood material is substantially planar and has a uniform thickness.

* * * * *